US010927701B2

(12) United States Patent
Sheshadri

(10) Patent No.: US 10,927,701 B2
(45) Date of Patent: Feb. 23, 2021

(54) TURBOCHARGER HAVING VARIABLE-VANE TURBINE NOZZLE INCLUDING SPACERS THAT ALSO SERVE AS HARD STOPS FOR THE VANES

(71) Applicant: Garrett Transportation I Inc., Torrance, CA (US)

(72) Inventor: Balaji Kiran Sheshadri, Bangalore (IN)

(73) Assignee: Garrett Transportation I Inc., Torrance, CA (US)

( * ) Notice: Subject to any disclaimer, the term of this patent is extended or adjusted under 35 U.S.C. 154(b) by 45 days.

(21) Appl. No.: 16/351,435

(22) Filed: Mar. 12, 2019

(65) Prior Publication Data
US 2020/0291811 A1 Sep. 17, 2020

(51) Int. Cl.
*F01D 17/16* (2006.01)
*F02C 6/12* (2006.01)

(52) U.S. Cl.
CPC ............. *F01D 17/165* (2013.01); *F02C 6/12* (2013.01); *F05D 2220/40* (2013.01); *F05D 2240/12* (2013.01); *F05D 2260/70* (2013.01)

(58) Field of Classification Search
CPC .......... F01D 17/10; F01D 17/12; F01D 17/14; F01D 17/16; F01D 17/165; F02C 6/12; F02B 37/24
See application file for complete search history.

(56) References Cited

U.S. PATENT DOCUMENTS

| | | | | |
|---|---|---|---|---|
| 4,804,316 A * | 2/1989 | Fleury | ................... | F01D 17/165 415/134 |
| 6,962,481 B2 * | 11/2005 | Knauer | ................. | F01D 17/165 415/160 |
| 7,670,107 B2 * | 3/2010 | Barthelet | .............. | F01D 17/165 415/160 |
| 8,328,503 B2 * | 12/2012 | Tries | ....................... | F01D 9/045 415/160 |
| 8,668,443 B2 * | 3/2014 | Espasa | .................. | F01D 17/165 415/160 |

(Continued)

FOREIGN PATENT DOCUMENTS

| | | |
|---|---|---|
| EP | 2351911 A2 | 3/2011 |
| EP | 3401505 A1 | 3/2018 |
| WO | 2008118833 A1 | 10/2008 |

OTHER PUBLICATIONS

Extended European Search Report in EP Appl. No. 20153212.4-1004, dated Jul. 27, 2020.

*Primary Examiner* — Nathaniel E Wiehe
*Assistant Examiner* — Jackson N Gillenwaters
(74) *Attorney, Agent, or Firm* — John C. James

(57) ABSTRACT

A variable-nozzle turbocharger includes a variable-vane mechanism that has an annular nozzle ring supporting an array of rotatable vanes, an insert having a nozzle portion axially spaced from the nozzle ring, and a plurality of spacers connected between the nozzle portion of the insert and the nozzle ring for maintaining an axial spacing between the nozzle portion of the insert and the nozzle ring. The spacers are structured and arranged to mechanically stop the vanes from rotating in one direction past a maximum-open position and to mechanically stop the vanes from rotating in an opposite direction past a minimum-open position of the vanes.

6 Claims, 5 Drawing Sheets

(56) References Cited

U.S. PATENT DOCUMENTS

| | | | |
|---|---|---|---|
| 9,017,017 B2* | 4/2015 | Sausse | F01D 17/165 |
| | | | 415/160 |
| 10,641,125 B2* | 5/2020 | Asakawa | F02B 37/24 |
| 2004/0096317 A1* | 5/2004 | Scholz | F01D 17/165 |
| | | | 415/160 |
| 2014/0147254 A1* | 5/2014 | Tashiro | F02C 6/12 |
| | | | 415/146 |
| 2014/0186171 A1* | 7/2014 | Naunheim | F01D 17/165 |
| | | | 415/208.1 |
| 2015/0308330 A1* | 10/2015 | Arnold | F02B 37/24 |
| | | | 60/602 |
| 2017/0145912 A1* | 5/2017 | Micanek | F02B 37/24 |
| 2018/0328281 A1* | 11/2018 | Eckl | F02C 6/12 |

* cited by examiner

TURBOCHARGER HAVING VARIABLE-VANE TURBINE NOZZLE INCLUDING SPACERS THAT ALSO SERVE AS HARD STOPS FOR THE VANES

BACKGROUND OF THE INVENTION

The present invention relates to turbochargers having a variable-nozzle turbine in which an array of movable vanes is disposed in the nozzle of the turbine for regulating exhaust gas flow into the turbine.

An exhaust gas-driven turbocharger is a device used in conjunction with an internal combustion engine for increasing the power output of the engine by compressing the air that is delivered to the air intake of the engine to be mixed with fuel and burned in the engine. A turbocharger comprises a compressor wheel mounted on one end of a shaft in a compressor housing and a turbine wheel mounted on the other end of the shaft in a turbine housing. Typically the turbine housing is formed separately from the compressor housing, and there is yet another center housing connected between the turbine and compressor housings for containing bearings for the shaft. The turbine housing defines a generally annular chamber that surrounds the turbine wheel and that receives exhaust gas from an engine. The turbine assembly includes a nozzle that leads from the chamber into the turbine wheel. The exhaust gas flows from the chamber through the nozzle to the turbine wheel and the turbine wheel is driven by the exhaust gas. The turbine thus extracts power from the exhaust gas and drives the compressor. The compressor receives ambient air through an inlet of the compressor housing and the air is compressed by the compressor wheel and is then discharged from the housing to the engine air intake.

One of the challenges in boosting engine performance with a turbocharger is achieving a desired amount of engine power output throughout the entire operating range of the engine. It has been found that this objective is often not readily attainable with a fixed-geometry turbocharger, and hence variable-geometry turbochargers have been developed with the objective of providing a greater degree of control over the amount of boost provided by the turbocharger.

One type of variable-geometry turbocharger is the variable-nozzle turbocharger (VNT), which includes an array of variable vanes in the turbine nozzle. The vanes are rotatably mounted to a nozzle ring, which forms one wall of the nozzle. The opposite wall of the nozzle is formed by an insert that fits into a space defined in the turbine housing. The axial spacing between the nozzle ring and the insert is maintained by several spacers that are connected between these parts. The vanes are connected to a mechanism that enables the setting angles of the vanes to be varied. Changing the setting angles of the vanes has the effect of changing the effective flow area in the turbine nozzle, and thus the flow of exhaust gas to the turbine wheel can be regulated by controlling the vane positions. In this manner, the power output of the turbine can be regulated, which allows engine power output to be controlled to a greater extent than is generally possible with a fixed-geometry turbocharger.

The present disclosure is directed toward improvements in variable-nozzle turbines of the type noted above.

BRIEF SUMMARY OF THE DISCLOSURE

The present disclosure describes a variable-nozzle turbocharger having a variable-nozzle turbine in which a plurality of spacers are employed for spacing the nozzle ring from the insert. In accordance with the invention, the spacers serve the additional role of hard stops that limit the rotatable travel of the vanes in both the open and close directions, thereby eliminating the need for separate hard stop components such as pins or the like. In one embodiment described herein, the turbocharger comprises:

a turbine assembly comprising a turbine housing and a turbine wheel mounted in the turbine housing and connected to a rotatable shaft for rotation therewith, the turbine housing defining a chamber surrounding the turbine wheel for receiving exhaust gas and for supplying the exhaust gas to the turbine wheel, the turbine assembly defining a nozzle leading from the chamber generally radially inwardly to the turbine wheel;

a compressor assembly comprising a compressor housing and a compressor wheel mounted in the compressor housing and connected to the rotatable shaft for rotation therewith;

a center housing connected between the compressor housing and the turbine housing;

a variable-vane assembly comprising a generally annular nozzle ring and an array of vanes circumferentially spaced about the nozzle ring and disposed in the nozzle such that exhaust gas flows between the vanes to the turbine wheel, each vane being rotatably mounted to the nozzle ring and connected to a rotatable actuator ring such that rotation of the actuator ring rotates the vanes for regulating exhaust gas flow to the turbine wheel;

an insert disposed in the turbine housing, the insert defining a nozzle portion axially spaced from the nozzle ring such that the vanes extend between the nozzle ring and the nozzle portion; and a plurality of spacers connected between the nozzle portion of the insert and the nozzle ring for maintaining an axial spacing between the nozzle portion of the insert and the nozzle ring;

wherein the spacers are structured and arranged to mechanically stop the vanes from rotating in one direction past a maximum-open position and to mechanically stop the vanes from rotating in an opposite direction past a minimum-open position.

In some embodiments of the invention, each vane is joined to an axle that passes through a bearing aperture in the nozzle ring, wherein an end of each axle projects out from the bearing aperture at a second face of the nozzle ring opposite from said first face and is joined to a vane arm. The vane arms engage the actuator ring such that rotation of the actuator ring causes the vane arms to pivot about the axles and thereby rotate the vanes. In accordance with said embodiments, at least one of said spacers has an extension portion that projects out from the second face of the nozzle ring and is structured and arranged to be abutted by one of said vane arms to mechanically stop the vanes from rotating in said one direction past said maximum-open position.

Optionally, multiple ones of said spacers can have such extension portions that project out from the second face of the nozzle ring and are structured and arranged to be abutted respectively by multiple ones of said vane arms to mechanically stop the vanes from rotating in said one direction past said maximum-open position.

In an embodiment of the invention, at least one of said spacers is structured and arranged to be abutted by one of said vanes to mechanically stop the vanes from rotating in said opposite direction past said minimum-open position. Optionally, multiple ones of said spacers can be structured and arranged to be abutted respectively by multiple ones of said vanes to mechanically stop the vanes from rotating in said opposite direction past said minimum-open position. In such embodiments, one of said spacers can be structured and arranged to be abutted by another one of said vanes to mechanically stop the vanes from rotating in said one direction past said maximum-open position.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE DRAWINGS

The present inventions now will be described more fully hereinafter with reference to the accompanying drawings, in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
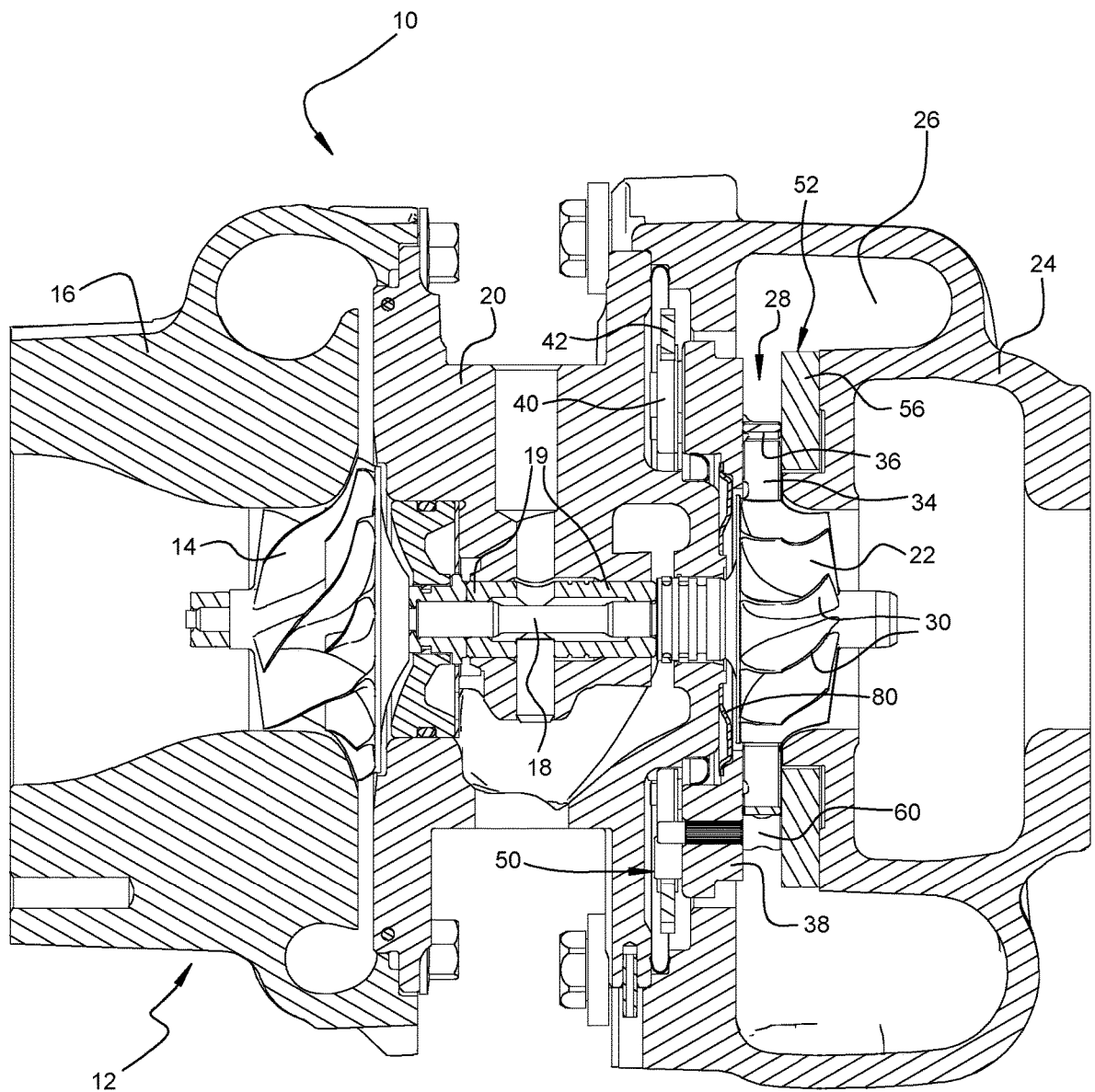
FIG. 1 is a cross-sectional view of a turbocharger in accordance with one embodiment of the invention.

A turbocharger 10 in accordance with one embodiment of the invention is illustrated in cross-sectional view in FIG. 1. The turbocharger comprises a compressor 12 having a compressor wheel or impeller 14 mounted in a compressor housing 16 on one end of a rotatable shaft 18. The shaft is supported in bearings 19 mounted in a center housing 20 of the turbocharger. The shaft 18 is rotated by a turbine wheel 22 mounted on the other end of the shaft 18 from the compressor wheel, thereby rotatably driving the compressor wheel, which compresses air drawn in through the compressor inlet and delivers the compressed air to the intake of an internal combustion engine (not shown) for boosting the performance of the engine.

The turbocharger also includes a turbine housing 24 that houses the turbine wheel 22. The turbine housing defines a generally annular chamber 26 that surrounds the turbine wheel and that receives exhaust gas from the internal combustion engine for driving the turbine wheel. The exhaust gas is directed from the chamber 26 generally radially inwardly through a turbine nozzle 28 to the turbine wheel 22. As the exhaust gas flow through the passages between the blades 30 of the turbine wheel, the gas is expanded to a lower pressure, and the gas discharged from the wheel exits the turbine housing through a generally axial bore 32 therein.

Reference is now made to FIGS. 2 through 5, which depict a subassembly of the turbocharger, comprising a variable-vane assembly for the turbine nozzle 28 for varying the cross-sectional flow area through the nozzle so as to regulate flow into the turbine wheel. The assembly includes a plurality of vanes 34 that are circumferentially spaced about the nozzle. Each vane is affixed to an axle 36 that passes through an aperture in a generally annular nozzle ring 38 that is mounted coaxially with respect to the turbine wheel 22. Each axle 36 is rotatable about its axis for rotating the attached vane. The nozzle ring 38 forms one wall of the flow passage of the nozzle 28. Each of the axles 36 has a vane arm 40 affixed to an end of the axle that protrudes out from the nozzle ring 38. The vane arms 40 are engaged by a generally annular unison ring 42 (also referred to herein as an actuator ring) that is rotatable about its axis and that is coaxial with the nozzle ring 38. Guides 39 mounted on the nozzle ring 38 are engaged with the inner perimeter of the unison ring for guiding its rotational movement so that it remains substantially concentric with the nozzle ring, and for preventing the unison ring from moving in the axial direction away from the nozzle ring. An actuator (not shown) is connected to the unison ring 42 for rotating it about its axis. When the unison ring is rotated, the vane arms 40 are rotated to cause the axles 36 to rotate about their axes, thereby rotating the vanes 34 so as to vary the cross-sectional flow area through the nozzle 28.

In the illustrated embodiment, the variable vane mechanism is provided in the form of a unit 50 that is installable into and removable from the turbocharger. The unit 50 comprises the nozzle ring 38, vanes 34, axles 36, vane arms 40, and unison ring 42. The unit works in cooperation with an insert 52 (FIG. 1) that is installed in the turbine housing 24. The insert defines a nozzle portion 56 that is axially spaced from the nozzle ring 38 such that the vanes 34 extend between the nozzle ring 38 and the nozzle portion 56.

The turbocharger includes a heat shroud 80 (FIG. 1) that is captively retained between the nozzle ring 38 and the center housing 20 when the variable-vane unit 50 is installed into the turbocharger. The heat shroud 80 provides sealing between the nozzle ring and center housing to prevent hot exhaust gas from migrating between these parts into the cavity in which the vane arms 40 and unison ring 42 are disposed. The heat shroud 80 advantageously is a resiliently elastic material such as spring steel or the like, and the shroud is configured so that it is compressed in the axial direction between the nozzle ring 38 and the center housing 20 so that the restoring force of the shroud urges the nozzle ring 38 axially toward the turbine wheel 22 (to the right in FIG. 1).

A plurality of spacers 60 are mounted to the nozzle ring 38 and project toward the nozzle portion 56 of the insert 52. Ends of the spacers 60 abut the nozzle portion 56 (as urged by the resilient heat shroud 80 described in the preceding paragraph) for maintaining the desired axial spacing between the nozzle portion 56 of the insert and the nozzle ring 38. The spacers thereby help ensure that there are small axial clearances between the ends of the vanes 34 and the nozzle ring 38 on one end and the nozzle portion 56 on the other end. The axial spacing set by the spacers 60 is designed to ensure that those clearance do not become too small, which could cause binding of the vanes, or too large, which could compromise turbine efficiency.

Figure 2:
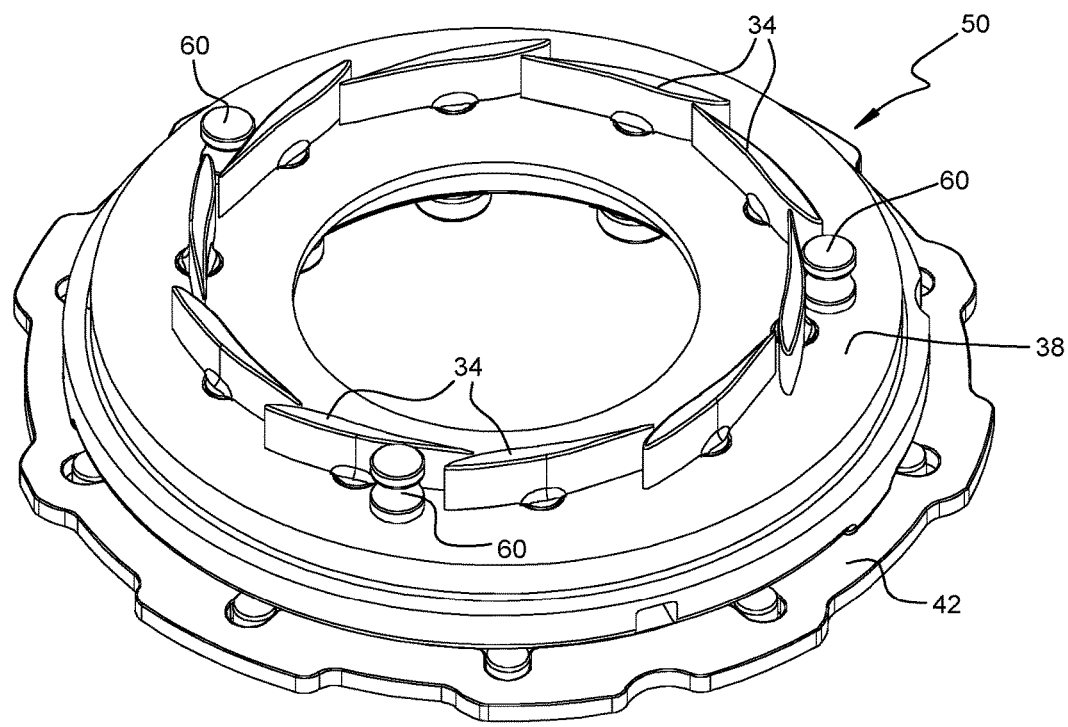
FIG. 2 is an isometric view of a variable-vane assembly for the turbocharger in accordance with one embodiment of the invention, viewed from a vane side of the assembly, the variable-vane assembly being shown with the vanes in a minimum-open position.
Figure 3:
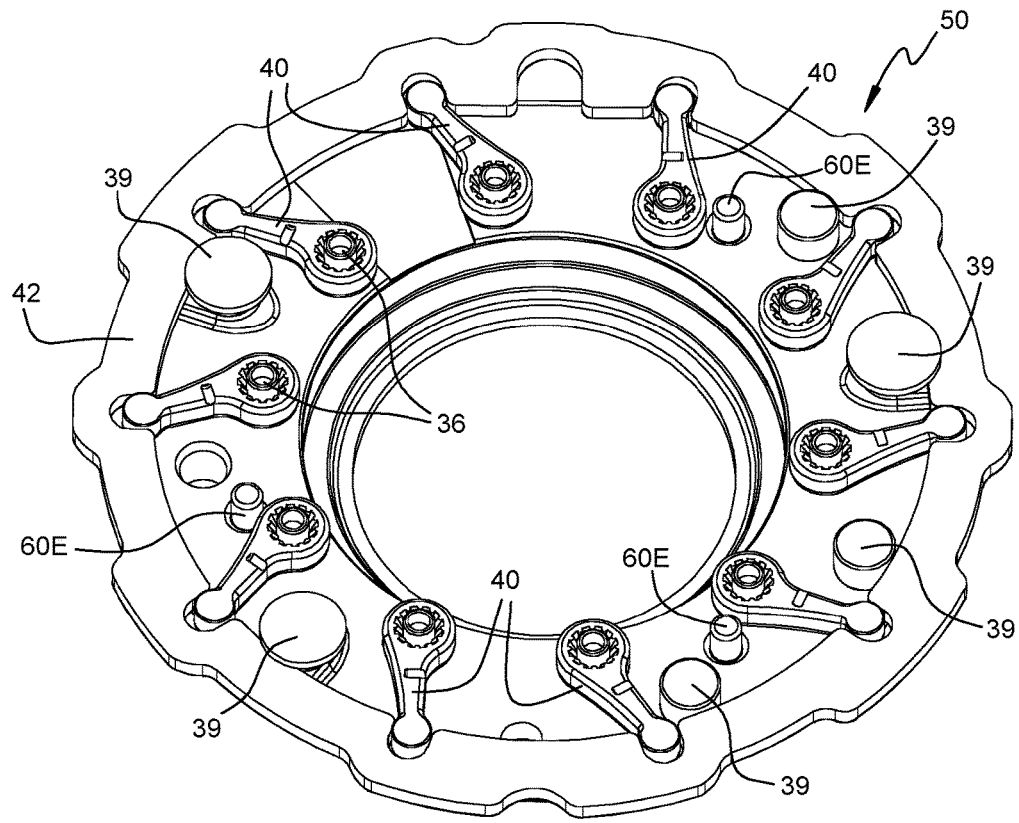
FIG. 3 is an isometric view of the variable-vane assembly of FIG. 2, viewed from an opposite side of the assembly.

With reference to FIGS. 2 and 3, in accordance with an embodiment of the invention, the spacers 60 serve not only to set the axial spacing between the nozzle ring 38 and the insert nozzle portion 56, but also acts as hard stops for the vane assembly to limit how far closed the vanes 34 can move. FIGS. 2 and 3 show the vanes 34 in a minimum-open position, which is set by certain ones of the vanes 34 abutting the spacers 60. More particularly, the spacers are configured and positioned with respect to the vanes so that the desired minimum-open position is achieved when a vane adjacent each of the three spacers 60 is rotated by the unison ring 42 until the vane abuts against the adjacent spacer.

Figure 4:
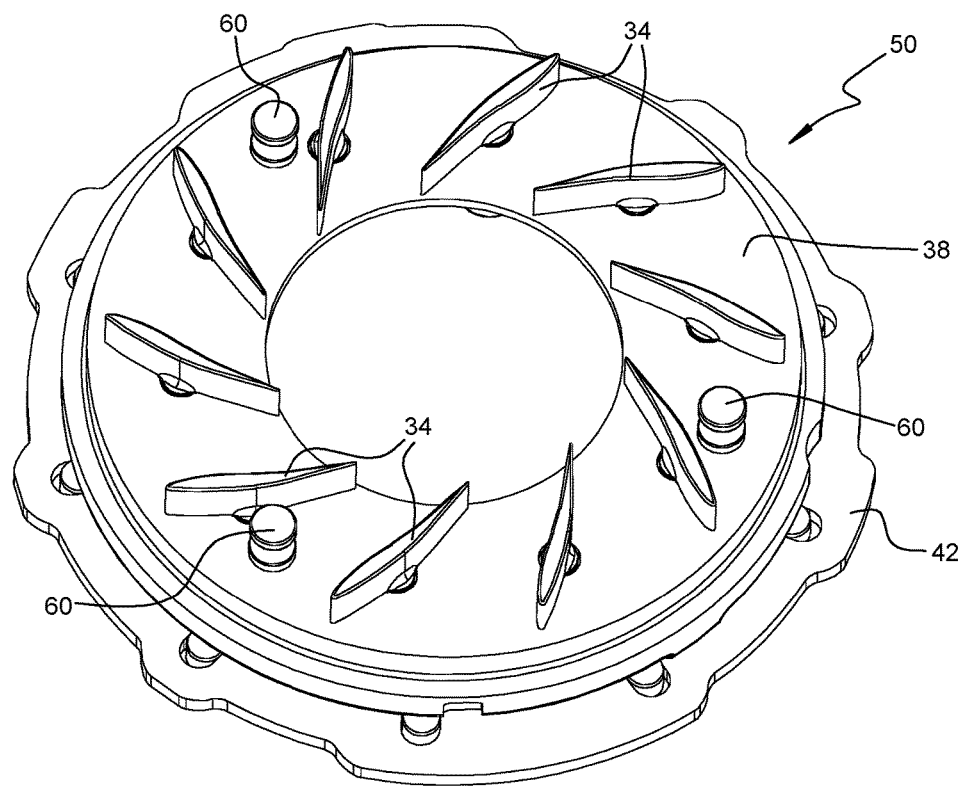
FIG. 4 is an isometric view similar to FIG. 2, but with the vanes in a maximum-open position.
Figure 5:
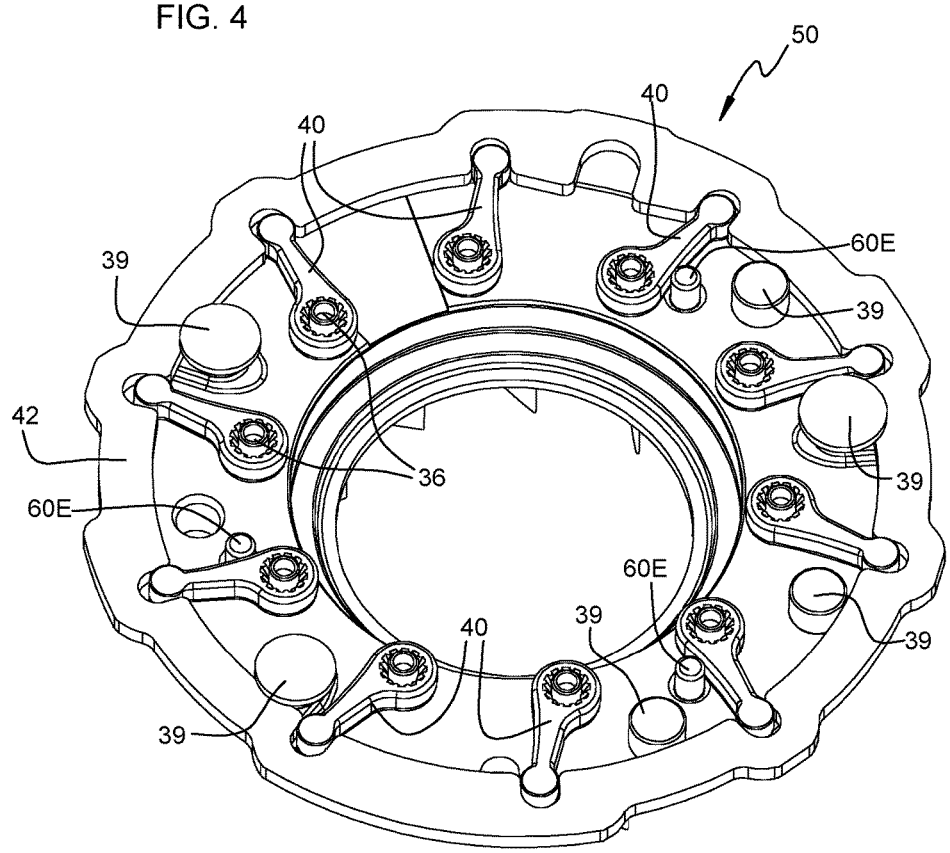
FIG. 5 is an isometric view similar to FIG. 3, but with the vanes in the maximum-open position.
Figure 6:
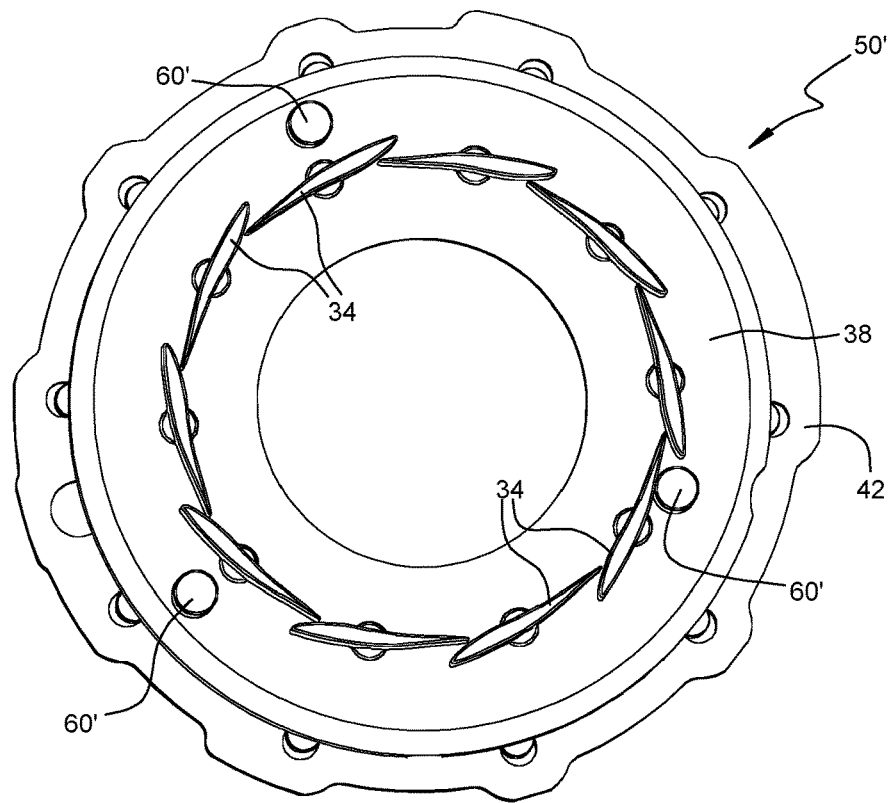
FIG. 6 is a plan view of a variable-vane assembly in accordance with another embodiment of the invention, as viewed from a vane side of the assembly, with the vanes shown in a minimum-open position.
Figure 7:
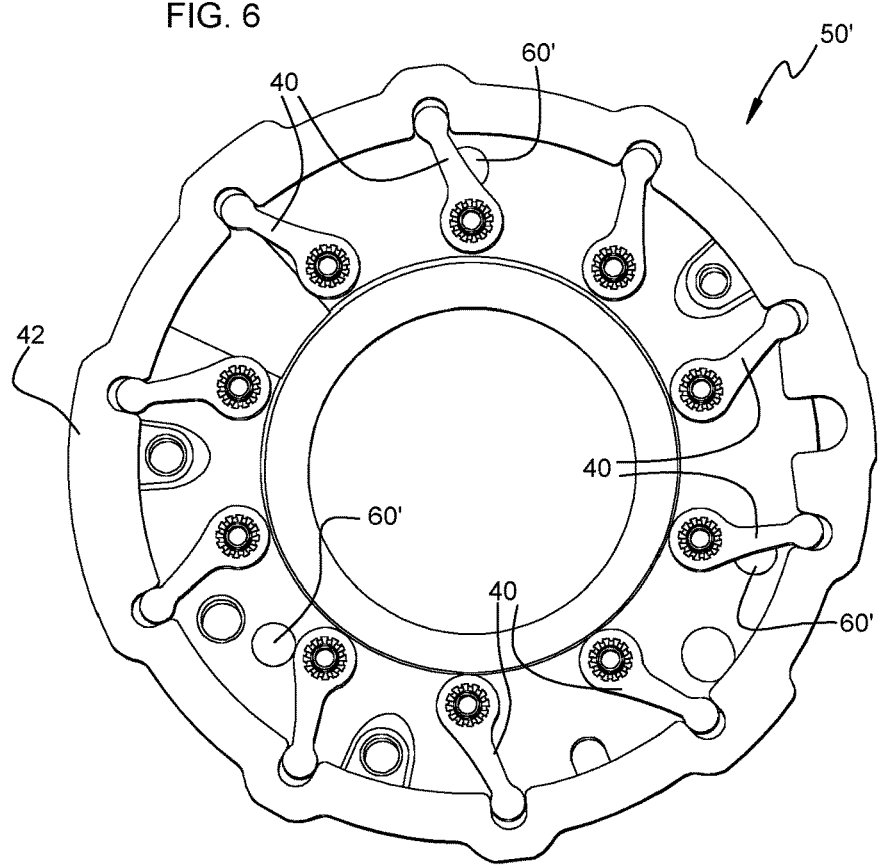
FIG. 7 is a plan view of the assembly of FIG. 6, as viewed from an opposite side of the assembly.

With reference to FIGS. 4 and 5, the spacers 60 also serve to set a maximum-open position of the vanes 34. Each spacer includes an extension portion 60E that projects out from the face of the nozzle ring 38 that is adjacent to the vane arms 40. The spacers are configured and positioned so that the extension portions 60E set the maximum-open position of the vanes when a vane arm 40 adjacent each extension portion 60E is rotated by the unison ring until it runs up against the extension portion.

The spacers 60 thus are multi-tasking components that allow the variable-vane unit 50 to be simplified in terms of number of components and number of manufacturing and assembly steps. Because the spacers serve not only as spacers but also as hard stops for the vane mechanism, the hard stop pins normally required for limiting the vane travel are eliminated, along with the manufacturing and assembly steps associated with their use.

The embodiment of the invention illustrated in FIGS. 2-5 and described above is only exemplary of one possible way of practicing the invention. The invention is not limited to the details of that embodiment, but can be practiced in many different ways. As another example, FIGS. 6 through 9 illustrate a second embodiment of a variable-vane unit 50' in accordance with the invention. In the second embodiment, the spacers 60' operate upon the vanes 34 only, not on the vane arms 40. Thus, with reference to FIG. 6, to set the minimum-open vane position, one of the three spacers is positioned so that the desired minimum-open position is achieved when a vane 34 adjacent that spacer is rotated by the unison ring 42 until the vane abuts the spacer. The other two spacers play no role in setting the minimum-open position.

Figure 8:
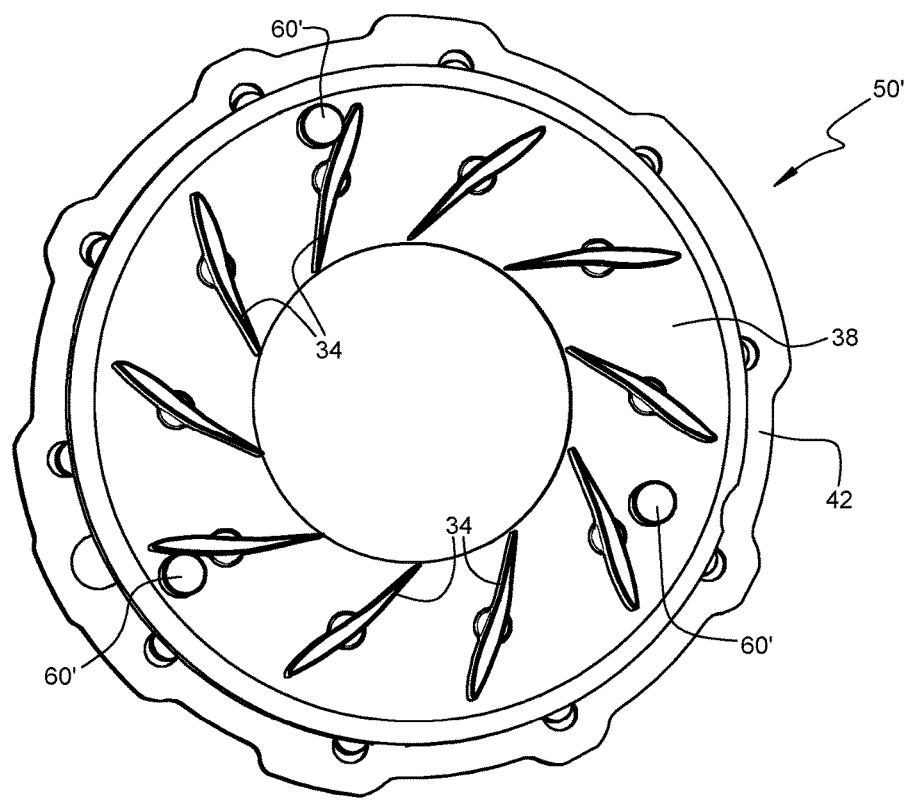
FIG. 8 shows the variable-vane assembly of FIG. 6 but with the vanes in a maximum-open position, as viewed from the vane side of the assembly.
Figure 9:
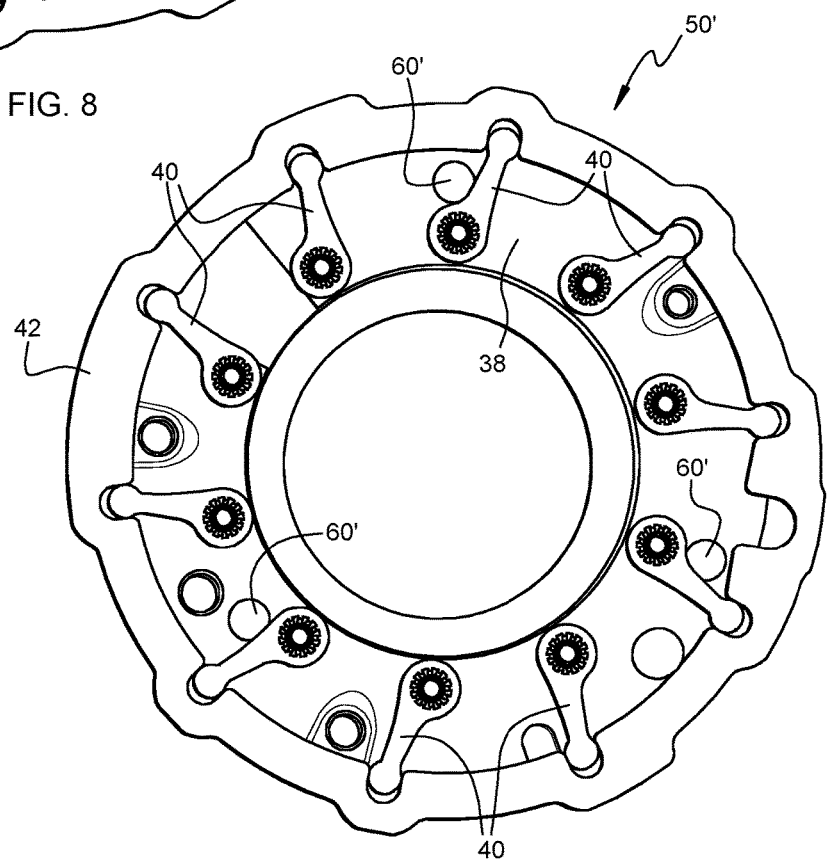
FIG. 9 shows the variable-vane assembly of FIG. 6 with the vanes in the maximum-open position, as viewed from the opposite side of the assembly.

With reference to FIG. 8, to set the maximum-open position, the other two spacers 60' are positioned so that the desired maximum-open position is achieved when a vane 34 adjacent each of those two spacers is rotated by the unison ring 42 until the vane abuts the adjacent spacer.

Other variations of using multi-tasking spacers as hard stops for the vane mechanism are also possible within the scope of the present invention. Any given spacer can serve as a hard stop for a vane or a vane arm for either the minimum-open position or the maximum-open position. It is not essential, however, that every spacer serve as a hard stop.

Thus, many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A turbocharger having a variable-nozzle turbine, comprising:
    a turbine assembly comprising a turbine housing and a turbine wheel mounted in the turbine housing and connected to a rotatable shaft for rotation therewith, the turbine housing defining a chamber surrounding the turbine wheel for receiving exhaust gas and for supplying the exhaust gas to the turbine wheel, the turbine assembly defining a nozzle leading from the chamber generally radially inwardly to the turbine wheel;
    a compressor assembly comprising a compressor housing and a compressor wheel mounted in the compressor housing and connected to the rotatable shaft for rotation therewith;
    a center housing connected between the compressor housing and the turbine housing;
    a variable-vane assembly comprising a generally annular nozzle ring and an array of vanes circumferentially spaced about the nozzle ring adjacent a first face thereof, the vanes being disposed in the nozzle such that exhaust gas flows between the vanes to the turbine wheel, each vane being rotatably mounted to the nozzle ring and connected to a rotatable actuator ring such that rotation of the actuator ring rotates the vanes for regulating exhaust gas flow to the turbine wheel;
    an insert disposed in the turbine housing, the insert defining a nozzle portion axially spaced from the first face of the nozzle ring such that the vanes extend between the nozzle ring and the nozzle portion; and
    a plurality of spacers connected between the nozzle portion of the insert and the nozzle ring for maintaining an axial spacing between the nozzle portion of the insert and the nozzle ring, wherein the spacers are structured and arranged to mechanically stop the vanes from rotating in one direction past a maximum-open position and to mechanically stop the vanes from rotating in an opposite direction past a minimum-open position, wherein at least one of said spacers is structured and arranged to be abutted by one of said vanes to mechanically stop the vanes from rotating in said opposite direction past said minimum-open position.

2. The turbocharger of claim 1, wherein each vane is joined to an axle that passes through a bearing aperture in the nozzle ring, wherein an end of each axle projects out from the bearing aperture at a second face of the nozzle ring opposite from said first face and is joined to a vane arm, wherein the vane arms engage the actuator ring such that rotation of the actuator ring causes the vane arms to pivot about the axles and thereby rotate the vanes, and wherein at least one of said spacers has an extension portion that projects out from the second face of the nozzle ring and is structured and arranged to be abutted by one of said vane arms to mechanically stop the vanes from rotating in said one direction past said maximum-open position.

3. The turbocharger of claim 2, wherein multiple ones of said spacers have extension portions that project out from the second face of the nozzle ring and are structured and arranged to be abutted respectively by multiple ones of said vane arms to mechanically stop the vanes from rotating in said one direction past said maximum-open position.

4. The turbocharger of claim 1, wherein multiple ones of said spacers are structured and arranged to be abutted respectively by multiple ones of said vanes to mechanically stop the vanes from rotating in said opposite direction past said minimum-open position.

5. The turbocharger of claim 1, wherein one of said spacers is structured and arranged to be abutted by another one of said vanes to mechanically stop the vanes from rotating in said one direction past said maximum-open position.

6. A turbocharger having a variable-nozzle turbine, comprising:
   a turbine assembly comprising a turbine housing and a turbine wheel mounted in the turbine housing and connected to a rotatable shaft for rotation therewith, the turbine housing defining a chamber surrounding the turbine wheel for receiving exhaust gas and for supplying the exhaust gas to the turbine wheel, the turbine assembly defining a nozzle leading from the chamber generally radially inwardly to the turbine wheel;
   a compressor assembly comprising a compressor housing and a compressor wheel mounted in the compressor housing and connected to the rotatable shaft for rotation therewith;
   a center housing connected between the compressor housing and the turbine housing;
   a variable-vane assembly comprising a generally annular nozzle ring and an array of vanes circumferentially spaced about the nozzle ring adjacent a first face thereof, the vanes being disposed in the nozzle such that exhaust gas flows between the vanes to the turbine wheel, each vane being rotatably mounted to the nozzle ring and connected to a rotatable actuator ring such that rotation of the actuator ring rotates the vanes for regulating exhaust gas flow to the turbine wheel;
   an insert disposed in the turbine housing, the insert defining a nozzle portion axially spaced from the first face of the nozzle ring such that the vanes extend between the nozzle ring and the nozzle portion; and
   a plurality of spacers connected between the nozzle portion of the insert and the nozzle ring for maintaining an axial spacing between the nozzle portion of the insert and the nozzle ring, wherein the spacers are structured and arranged to mechanically stop the vanes from rotating in one direction past a maximum-open position and to mechanically stop the vanes from rotating in an opposite direction past a minimum-open position, wherein at least one of said spacers is structured and arranged to be abutted by one of said vanes to mechanically stop the vanes from rotating in said one direction past said maximum-open position.

* * * * *